US012774158B2

(12) United States Patent
Zhu

(10) Patent No.: US 12,774,158 B2
(45) Date of Patent: Oct. 27, 2026

(54) GOODS LOADING AND UNLOADING APPARATUS FIXED ON GOODS SHELF

(71) Applicant: LIBIAO ROBOTICS HOLDINGS PTE. LTD., Singapore (SG)

(72) Inventor: Jianqiang Zhu, Hangzhou (CN)

(73) Assignee: LIBIAO ROBOTICS HOLDINGS PTE. LTD., Singapore (SG)

( * ) Notice: Subject to any disclaimer, the term of this patent is extended or adjusted under 35 U.S.C. 154(b) by 433 days.

(21) Appl. No.: 18/694,688

(22) PCT Filed: Jun. 1, 2022

(86) PCT No.: PCT/CN2022/096688
§ 371 (c)(1),
(2) Date: Mar. 22, 2024

(87) PCT Pub. No.: WO2023/045398
PCT Pub. Date: Mar. 30, 2023

(65) Prior Publication Data
US 2025/0002254 A1 Jan. 2, 2025

(30) Foreign Application Priority Data
Sep. 25, 2021 (CN) .......................... 202111124857.0

(51) Int. Cl.
*B65G 1/04* (2006.01)
*B65G 1/127* (2006.01)
*B66F 9/07* (2006.01)

(52) U.S. Cl.
CPC ......... *B65G 1/0421* (2013.01); *B65G 1/0407* (2013.01); *B65G 1/0414* (2013.01);
(Continued)

(58) Field of Classification Search
CPC ................ B65G 1/0414; B65G 1/0421; B65G 1/0492; B65G 1/0435; B66F 9/07
See application file for complete search history.

(56) References Cited

U.S. PATENT DOCUMENTS 3,593,863 A * 7/1971 Kintner ................ B65G 1/0421
414/273
4,252,217 A 2/1981 Benjamin
(Continued)

FOREIGN PATENT DOCUMENTS

CN 101353106 A 1/2009
CN 204355612 U 5/2015
(Continued)

OTHER PUBLICATIONS

China National Intellectual Property Administration, International Search Report, Application No. PCT/CN2022/096688, mailed Sep. 9, 2022, 3 pages.
(Continued)

*Primary Examiner* — Ernesto A Suarez
*Assistant Examiner* — Adarsh Neupane
(74) *Attorney, Agent, or Firm* — Ziegler IP Law Group, LLC.

(57) ABSTRACT

A goods loading and unloading apparatus fixed on a goods rack includes: a first vertical rod, provided with a first vertical sliding block driven by a first vertical movement driving device, a first upper roller, and a first lower roller driven by a lower driving electric motor; a second vertical rod, provided with a second vertical sliding block driven by a second vertical movement driving device, a second lower roller, and a second upper roller driven by an upper driving electric motor, the upper and lower rollers moving along upper and lower guide rails respectively; a loading and unloading device, hinged to the first and second vertical sliding blocks, and configured to move to a designated position in the goods rack; a posture sensor fixed on the first vertical rod; and a controller for controlling displacement speeds of the upper and lower driving electric motors to remain synchronous.

20 Claims, 7 Drawing Sheets

(52) U.S. Cl.
CPC .............. *B65G 1/0435* (2013.01); *B66F 9/07* (2013.01); *B65G 1/127* (2013.01)

(56) References Cited

U.S. PATENT DOCUMENTS

| | | | | |
|---|---|---|---|---|
| 8,110,511 | B2 | 2/2012 | Lei et al. | |
| 2003/0034183 | A1 | 2/2003 | Kortesmaki | |
| 2007/0032903 | A1 | 2/2007 | Tsujimoto | |
| 2010/0167503 | A1 | 7/2010 | Lei et al. | |
| 2025/0122012 | A1 * | 4/2025 | Labib .................... | B65G 1/0407 |

FOREIGN PATENT DOCUMENTS

| | | | | | |
|---|---|---|---|---|---|
| CN | 206590430 | U | * | 10/2017 | |
| CN | 107416401 | A | | 12/2017 | |
| CN | 206961233 | U | * | 2/2018 | |
| CN | 207618383 | U | | 7/2018 | |
| CN | 108639647 | A | | 10/2018 | |
| CN | 109625730 | A | | 4/2019 | |
| CN | 110386391 | A | | 10/2019 | |
| CN | 209480461 | U | * | 10/2019 | |
| CN | 211056046 | U | | 7/2020 | |
| CN | 113003237 | A | | 6/2021 | |
| CN | 113321018 | A | | 8/2021 | |
| CN | 113830485 | A | | 12/2021 | |
| CN | 118637239 | A | * | 9/2024 | ........... B65G 1/0492 |
| FR | 2332948 | A1 | | 6/1977 | |
| GB | 1432224 | A | | 4/1976 | |
| TW | 1401765 | B | | 7/2013 | |
| TW | 1415211 | B | | 11/2013 | |
| TW | 1452003 | B | | 9/2014 | |
| WO | 2010041492 | A1 | | 4/2010 | |

OTHER PUBLICATIONS

China Patent Office, Notification to Grant, Application No. 202111124857.0, mailed Nov. 21, 2022, 1 page.

China State Intellectual Property Office, Written Opinion of the International Searching Authority, Application No. PCT/CN2022/096688, mailed Sep. 9, 2022, 4 pages, English Translation 2 pages.

Taiwain Patent Office, Patent approval letter from the Intellectual Property Bureau of the Ministry of Economic Affairs, Application No. 111136159.2, mailed Jan. 30, 2022, 2 pages.

Taiwan Patent Office, Notice of review opinion from the Intellectual Property Bureau of the Ministry of Economic Affairs, Application No. 111136159, mailed Aug. 15, 2021, 6 pages.

The State Intellectual Property Office of People's Republic of China, Application No. 202111124857.0, mailed Oct. 31, 2022, 4 pages, English Translation 7 pages.

* cited by examiner

GOODS LOADING AND UNLOADING APPARATUS FIXED ON GOODS SHELF

CROSS-REFERENCE TO RELATED APPLICATIONS

The present disclosure claims priority to the Chinese patent application No. 2021111248570 filed with the China National Intellectual Property Administration on Sep. 25, 2021 and entitled "GOODS LOADING AND UNLOADING EQUIPMENT FIXED ON GOODS RACK", the contents of which are incorporated herein by reference in entirety.

TECHNICAL FIELD

The present disclosure relates to a goods loading and unloading apparatus fixed on a goods rack (goods shelf).

BACKGROUND ART

Storing goods with goods shelves has the characteristics of a large capacity, a small occupied area, convenient goods loading and unloading, and a low cost. In order to improve the degree of automation of goods loading and unloading, an independent loading and unloading apparatus for goods shelves is usually provided. Chinese Patent CN202110194574.7 discloses a dual power driving-based parallel movable shelf/rack and an unloading device thereof, wherein the unloading device is mounted at a side of the goods rack and can automatically complete goods loading and unloading, but also has the following problems: a complex overall structure, a large volume, occupying passages between goods shelves, and a high cost.

SUMMARY

The present disclosure provides a goods loading and unloading apparatus fixed on a goods rack, so as to at least overcome the above shortcomings.

The goods loading and unloading apparatus fixed on a goods rack provided in the present disclosure may include:

an upper guide rail and a lower guide rail, wherein the upper guide rail and the lower guide rail may be respectively fixed to an upper portion and a lower portion of the goods rack, the upper guide rail and the lower guide rail may be provided in parallel, bins can be stored in the goods rack, and the bins can store goods;

a first vertical rod, wherein an upper portion of the first vertical rod may be hinged to a first upper driving bracket, the first upper driving bracket may be mounted with a first upper roller, a lower portion of the first vertical rod may be hinged to a first lower driving bracket, and the first lower driving bracket may be mounted with a first lower roller;

a second vertical rod, wherein an upper portion of the second vertical rod may be hinged to a second upper driving bracket, the second upper driving bracket may be mounted with a second upper roller, a lower portion of the second vertical rod may be hinged to a second lower driving bracket, and the second lower driving bracket may be mounted with a second lower roller, at least one of the first upper roller and the second upper roller may be driven by an upper driving electric motor, at least one of the first lower roller and the second lower roller may be driven by a lower driving electric motor, the first upper roller and the second upper roller only can roll back and forth along the upper guide rail, and the first lower roller and the second lower roller only can roll back and forth along the lower guide rail;

an upper connecting rod, wherein two ends of the upper connecting rod may be fixed to the first upper driving bracket and the second upper driving bracket, respectively;

a lower connecting rod, wherein two ends of the lower connecting rod may be fixed to the first lower driving bracket and the second lower driving bracket, respectively;

a first vertical movement driving device, wherein the first vertical movement driving device may be provided with a first vertical sliding block, the first vertical movement driving device can control the first vertical sliding block to be capable of moving up and down only along the first vertical rod, and the first vertical sliding block is fixed with a first vertical movement bracket;

a second vertical movement driving device, wherein the second vertical movement driving device may be provided with a second vertical sliding block, the second vertical movement driving device can control the second vertical sliding block to be capable of moving up and down only along the second vertical rod, and the second vertical sliding block is fixed with a second vertical movement bracket;

a loading and unloading device, wherein the loading and unloading device may be provided with a loading and unloading rack, two corresponding sides of the loading and unloading rack may be hinged to the first vertical movement bracket and the second vertical movement bracket respectively, and the loading and unloading device can transport the bins on the goods rack onto the loading and unloading rack; or transport the bins on the loading and unloading rack onto the goods rack;

a posture sensor, wherein the posture sensor may be fixed on the first vertical rod or the second vertical rod, and the posture sensor can collect inclination angles of the first vertical rod and the second vertical rod; and a controller, wherein the controller may be electrically connected to the upper driving electric motor, the lower driving electric motor, an electric control device of the first vertical movement driving device, an electric control device of the second vertical movement driving device, an electric control device of the loading and unloading device, the posture sensor and a server respectively, the controller may load and unload goods according to an instruction of the server, the controller further can control, according to a signal of the posture sensor, a displacement speed of the upper driving electric motor and a displacement speed of the lower driving electric motor to remain synchronous, such that the first vertical rod and the second vertical rod can maintain postures thereof in a vertical direction when moving.

Optionally, the loading and unloading device may include:

a sliding rail, wherein the sliding rail may be fixed on the loading and unloading rack;

a loading and unloading sliding block, wherein the loading and unloading sliding block only can move along the sliding rail;

a dragging assembly, wherein the dragging assembly may control the loading and unloading sliding block to move, by a dragging electric motor; and a gripping device, wherein the gripping device may be provided with:

a swing electric motor, wherein a housing of the swing electric motor may be fixed to the loading and unloading sliding block;

a speed reducer, wherein a housing of the speed reducer may be fixed to the loading and unloading sliding block, and an input shaft of the speed reducer may be coupled to a rotating shaft of the swing electric motor;

a swing rod, wherein the swing rod may be in an L shape, and one end of the swing rod may be fixed to an output shaft of the speed reducer;

a gripping electric motor, wherein a housing of the gripping electric motor may be fixed to the other end of the swing rod; and a gripping hook, wherein the gripping hook may be fixed to a rotating shaft of the gripping electric motor, the loading and unloading rack may be provided with an elongated slot, and the swing rod may penetrate out from the elongated slot, wherein the dragging electric motor, the swing electric motor and the gripping electric motor may be electrically connected to the controller, respectively; and the controller may control the swing rod via the swing electric motor to swing towards either of two goods shelves, controls the gripping hook via the gripping electric motor to grasp an edge of the bin, and can, via the dragging electric motor, drag a designated bin onto the loading and unloading rack, or push the bin on the loading and unloading rack onto a designated position in the goods rack.

Optionally, the dragging assembly may include:

the dragging electric motor, wherein a housing of the dragging electric motor may be fixed to the loading and unloading rack, and a main shaft of the dragging electric motor may be fixed with a dragging driving wheel;

a dragging driven wheel, wherein a shaft core of the dragging driven wheel may be fixed to the loading and unloading rack; and a dragging belt, wherein the dragging belt may be coupled to the dragging driving wheel and the dragging driven wheel, and the dragging belt may be fixed to the loading and unloading sliding block.

Optionally, the speed reducer may be connected in series between the gripping hook and the gripping electric motor.

Optionally, a synchronous belt may be chosen as the dragging belt, and synchronous pulleys may be chosen as the dragging driving wheel and the dragging driven wheel.

Optionally, the sliding rail may be designed as a dovetail groove, the loading and unloading sliding block may be designed as a dovetail block, so that the loading and unloading sliding block slides in the sliding rail and does not fall down; or the sliding rail may be designed as a T-shaped groove, a part of the loading and unloading sliding block may be shaped as a T-shaped block, and the T-shaped block of the loading and unloading sliding block may slide in the sliding rail of the T-shaped groove, so that the loading and unloading sliding block slides in the sliding rail and does not fall down.

Optionally, the loading and unloading device further may include:

a first conveying driven wheel, wherein a shaft core of the first conveying driven wheel may be fixed to the loading and unloading rack;

a first conveying electric motor, wherein a housing of the first conveying electric motor may be fixed to the loading and unloading rack, and a rotating shaft of the first conveying electric motor may be fixed with the first conveying driving wheel;

a first conveying belt, wherein the first conveying belt may be coupled to the first conveying driven wheel and the first conveying driving wheel;

a second conveying driven wheel, wherein a shaft core of the second conveying driven wheel may be fixed to the loading and unloading rack and located above the loading and unloading rack;

a second conveying electric motor, wherein a housing of the second conveying electric motor is fixed to the loading and unloading rack, and a main shaft of the second conveying electric motor may be fixed with a second conveying driving wheel; and a second conveying belt, wherein the second conveying belt may be coupled to the second conveying driven wheel and the second conveying driving wheel, and the second conveying belt may be provided in parallel with the first conveying belt, wherein the first conveying electric motor and the second conveying electric motor may be electrically connected to the controller, respectively; and under control of the controller, the bin can be dragged onto the first conveying belt and the second conveying belt, the gripping hook, after being disengaged from the bin, is swung away from the bin via the swing rod, and then the bin is transported to a central position of the loading and unloading rack by the first conveying belt and the second conveying belt.

Optionally, two sides of the loading and unloading rack may be bent upwards to form a first horizontal step and a second horizontal step that are symmetrical, the first horizontal step may be connected upwards to a first vertical surface, the second horizontal step may be connected upwards to a second vertical surface, two ends of the first horizontal step may be respectively cut to form first notches, sheets cut from the first notches may be connected to the first vertical surface, two ends of the second horizontal step may be respectively cut to form second notches, sheets cut from the second notches may be connected to the second vertical surface, the first conveying driving wheel and the first conveying driven wheel may be located in the first notches respectively, the shaft cores of the first conveying driving wheel and the first conveying driven wheel may be fixed on the first vertical surface respectively, the second conveying driving wheel and the second conveying driven wheel may be located in the second notches respectively, the second conveying driving wheel and the second conveying driven wheel may be fixed on the second vertical surface respectively, the first conveying belt may surround the first horizontal step, and the second conveying belt may surround the second horizontal step.

Optionally, the first upper driving bracket or the first lower driving bracket may be provided with a first elastic force-dividing device, and the second upper driving bracket or the second lower driving bracket may be provided with a second elastic force-dividing device, wherein the first elastic force-dividing device can ensure that when the first upper roller and the first lower roller are rolling, the first upper roller and the first lower roller always share certain weights; and the second elastic force-dividing device can ensure that when the second upper roller and the second lower roller are rolling, the second upper roller and the second lower roller always share certain weights.

Optionally, the first elastic force-dividing device may include:

a first upper hinging disk, wherein the first upper hinging disk may be provided with a first annular groove, the first upper hinging disk may be fixed to the first vertical rod, the first upper driving bracket may be partially embedded into the first annular groove and hinged to the first upper hinging disk, and the first upper driving bracket can move up and down for a certain distance relative to the first upper hinging disk; and a first force-dividing tension spring, wherein one end of the first force-dividing tension spring may be fixed to the first upper driving bracket, and the other end of the first force-dividing tension spring may be fixed to the first vertical rod; and the second elastic force-dividing device may include:

a second upper hinging disk, wherein the second upper hinging disk may be provided with a second annular groove, the second upper hinging disk may be fixed to the second vertical rod, the second upper driving bracket may be partially embedded into the second annular groove and hinged to the second upper hinging disk, and the second upper driving bracket can move up and down for a certain distance relative to the second upper hinging disk; and a second force-dividing tension spring, wherein one end of the second force-dividing tension spring may be fixed to the second upper driving bracket, and the other end of the second force-dividing tension spring may be fixed to the second vertical rod.

Optionally, the upper guide rail and the lower guide rail may be electrically insulated from the goods rack, the first vertical rod and the second vertical rod, and the upper guide rail and the lower guide rail may be electrically connected to a positive pole and a negative pole of a charger, respectively; and the goods loading and unloading apparatus further may include:

an upper electromagnet coil, wherein the upper electromagnet coil may be fixed to the first upper driving bracket or the second upper driving bracket by an upper charging bracket, an iron core of the upper electromagnet coil is fixed with an upper electrode via an upper insulating material, and the upper electrode is electrically connected to a positive pole of a rechargeable battery in the controller via an upper flexible wire, the upper electromagnet coil is electrically connected to the controller, and when the first upper roller does not rotate, the upper electromagnet coil performs attracting and charging; and a lower electromagnet coil, wherein the lower electromagnet coil may be fixed to the first lower driving bracket or the second lower driving bracket via a lower charging bracket, an iron core of the lower electromagnet coil is fixed with a lower electrode via a lower insulating material, the lower electrode is electrically connected to a negative pole of the rechargeable battery in the controller via a lower flexible wire, the lower electromagnet coil is electrically connected to the controller, and when the first lower roller does not rotate, the lower electromagnet coil performs attracting and charging.

Optionally, the first upper roller or the second upper roller may be provided with a first rolling friction increasing device, wherein the first rolling friction increasing device can increase friction force between the first upper roller or the second upper roller and the upper guide rail, and the first lower roller or the second lower roller may be provided with a second rolling friction increasing device, and wherein the second rolling friction increasing device can increase friction force between the first lower roller or the second lower roller and the lower guide rail.

Optionally, the first rolling friction increasing device may include:

an upper friction assisted wheel, wherein the upper friction assisted wheel may be rotatably coupled to an upper fixed shaft, and the first upper driving bracket may be provided with a first elongated slot configured for fixing the upper fixed shaft and capable of swinging up and down;

an upper shaft sleeve, wherein the upper shaft sleeve may be sleeved over a rotating shaft of the upper driving electric motor; and an upper friction increasing tension spring, wherein one end of the upper friction increasing tension spring may be coupled to the upper fixed shaft, and the other end of the upper friction increasing tension spring may be coupled to the upper shaft sleeve; and the second rolling friction increasing device may include:

a lower friction assisted wheel, wherein the lower friction assisted wheel may be rotatably coupled to the lower fixed shaft, and the first lower driving bracket may be provided with a second elongated slot configured for fixing the lower fixed shaft and capable of swinging up and down;

a lower shaft sleeve, wherein the lower shaft sleeve may be sleeved over a rotating shaft of the lower driving electric motor; and a lower friction increasing tension spring, wherein one end of the lower friction increasing tension spring may be coupled to the lower fixed shaft, and the other end of the lower friction increasing tension spring may be coupled to the lower shaft sleeve.

Optionally, the first vertical movement driving device may include:

the first vertical rod, wherein the first vertical rod may be of a hollow structure, the first vertical rod may be provided with a first open end, and two side surfaces of the first vertical rod may be each provided with a first groove;

a first synchronous pulley and a second synchronous pulley, wherein the first synchronous pulley and the second synchronous pulley may be rotatably fixed to two ends inside the first vertical rod, respectively;

a first synchronous belt, wherein the first synchronous belt may be wound outside the first synchronous pulley and the second synchronous pulley;

a first vertical movement driving electric motor, wherein a housing of the first vertical movement driving electric motor may be fixed to the first vertical rod, a rotating shaft of the first vertical movement driving electric motor may be fixed to a central shaft of the first synchronous pulley or the second synchronous pulley, and the first vertical movement driving electric motor may be electrically connected to the controller; and the first vertical sliding block, wherein the first vertical sliding block may be provided with a first bump and two first guide blocks, the first bump can be embedded into the first open end of the first vertical rod and be fixed to the first synchronous belt, and the first guide blocks can move up and down only along the first grooves; and the second vertical movement driving device may include:

the second vertical rod, wherein the second vertical rod may be of a hollow structure, the second vertical rod may be provided with a second open end, and two side surfaces of the second vertical rod may be each provided with a second groove;

a third synchronous pulley and a fourth synchronous pulley, wherein the third synchronous pulley and the fourth synchronous pulley may be rotatably fixed to two ends inside the second vertical rod, respectively;

a second synchronous belt, wherein the second synchronous belt may be wound outside the third synchronous pulley and the fourth synchronous pulley;

a second vertical movement driving electric motor, wherein a housing of the second vertical movement driving electric motor may be fixed to the second vertical rod, a rotating shaft of the second vertical movement driving electric motor may be fixed to a central shaft of the third synchronous pulley or the fourth synchronous pulley, and the second vertical movement driving electric motor may be electrically connected to the controller; and the second vertical sliding block, wherein the second vertical sliding block may be provided with a second bump and two second guide blocks, and wherein the second bump can be embedded into a second open end of the second vertical rod and be fixed to the second synchronous belt, and the second guide blocks can move up and down only along the second grooves.

Cross sections of the upper guide rail and the lower guide rail may each be in an inverted U shape, the first upper roller and the second upper roller may roll on a top surface of the upper guide rail, the first lower roller and the second lower roller may roll on a top surface of the lower guide rail, and the goods loading and unloading apparatus further may include:

a first upper guiding wheel, wherein a shaft core of the first upper guiding wheel may be fixed to the first upper driving bracket via a first upper guiding bracket;

a second upper guiding wheel, wherein a shaft core of the second upper guiding wheel may be fixed to the second upper driving bracket via a second upper guiding bracket, wherein the first upper guiding wheel and the second upper guiding wheel may be inserted into the upper guide rail, and can roll to touch either of two side walls of the guide rail;

a first lower guiding wheel, wherein a shaft core of the first lower guiding wheel may be fixed to the first lower driving bracket via a first lower guiding bracket; and a second lower guiding wheel, wherein a shaft core of the second lower guiding wheel may be fixed to the second lower driving bracket via a second lower guiding bracket, wherein the first lower guiding wheel and the second lower guiding wheel may be inserted into the lower guide rail, and can roll to touch either of the two side walls of the lower guide rail.

Compared with the related art, the present disclosure at least has the following advantages.

The present disclosure can be directly fixed on the goods rack, which saves the cost of the apparatus, improves the capacity of the goods rack, saves the land used, and facilitates transportation and packaging;

two adjacent goods shelves in the present disclosure may share one loading and unloading device, and the loading and unloading device can be designed to load and unload goods from either of the two goods shelves, which may greatly reduce the cost;

by providing the posture sensor, the present disclosure can ensure the vertical rods to be in the vertical postures, improve the operation stability, reduce the power loss, and improve the transportation speed;

by supporting the loading and unloading device jointly by the double vertical rods, the present disclosure can effectively improve the load capacity; and in the present disclosure, the rolling friction increasing devices are provided, which can further improve the transportation speed.

The present disclosure has the beneficial effects of a reasonable structure, a low cost, convenient installation, transportation and packaging, a small occupied area, a large load capacity, a fast goods loading and unloading speed and power consumption reduction.

DETAILED DESCRIPTION OF EMBODIMENTS

The present disclosure is further illustrated in conjunction with drawings.

Figure 1:
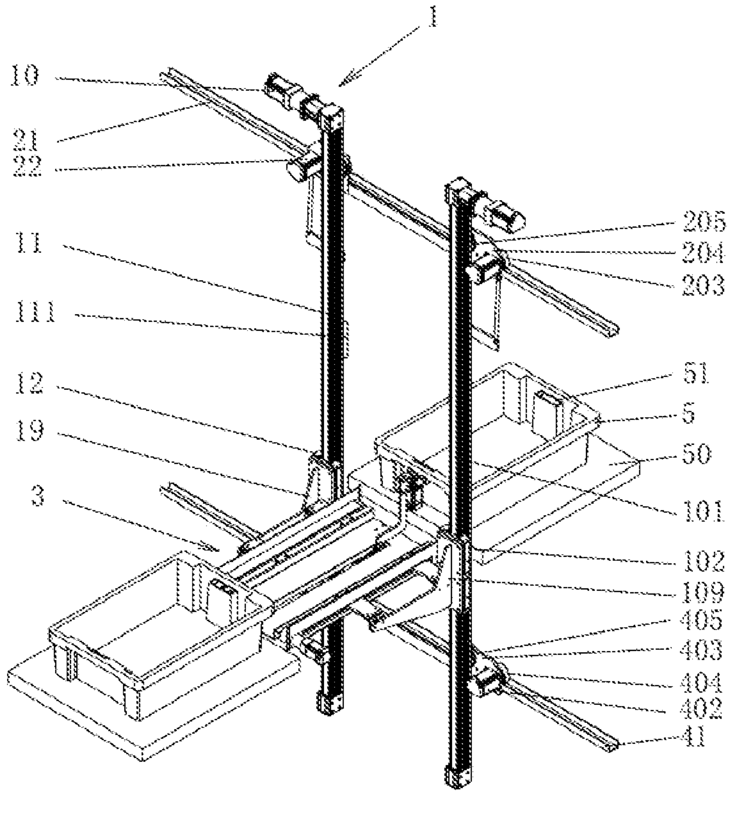
FIG. 1 is a front perspective view of an overall structure of the present disclosure.
Figure 2:
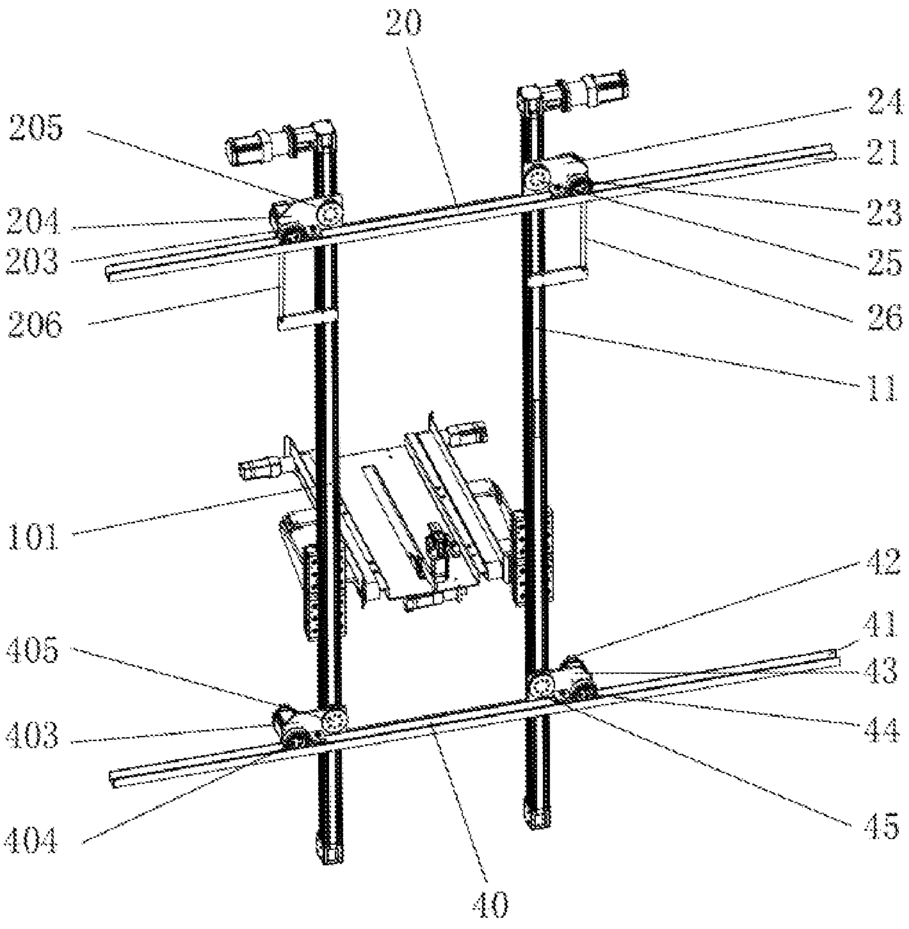
FIG. 2 is a rear perspective view of the present disclosure, with bins being omitted.
Figure 3:
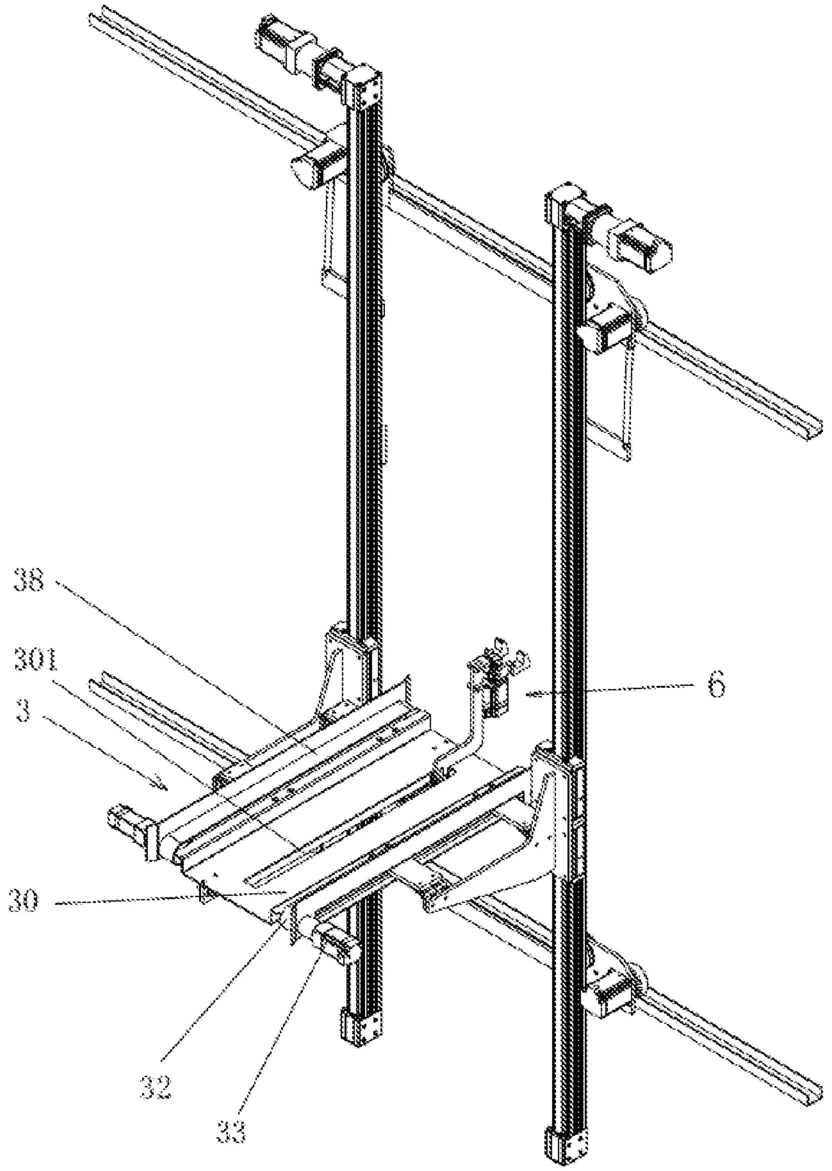
FIG. 3 is a perspective view of FIG. 2, with bins being omitted.

As shown in FIG. 1 to FIG. 3, a goods loading and unloading apparatus fixed on a goods rack includes:

an upper guide rail 21 and a lower guide rail 41, wherein the upper guide rail 21 and the lower guide rail 41 are respectively fixed to an upper portion and a lower portion of the goods rack, the upper guide rail 21 and the lower guide rail 41 are provided in parallel, bins 5 can be stored in the goods rack, and the bins 5 can store goods;

a first vertical rod 11, wherein an upper portion of the first vertical rod 11 is hinged to a first upper driving bracket 24, the first upper driving bracket 24 is mounted with a first upper roller 23, a lower portion of the first vertical rod 11 is hinged to a first lower driving bracket 43, and the first lower driving bracket 43 is mounted with a first lower roller 44;

a second vertical rod 101, wherein an upper portion of the second vertical rod 101 is hinged to a second upper driving bracket 204, the second upper driving bracket 204 is mounted with a second upper roller 203, a lower portion of the second vertical rod 101 is hinged to a second lower driving bracket 403, and the second lower driving bracket 403 is mounted with a second lower roller 404, at least one of the first upper roller 23 and the second upper roller 203 is driven by an upper driving electric motor 22, a housing of the upper driving electric motor 22 is fixed on the first upper driving bracket 24 or the second upper driving bracket 204, and a rotating shaft of the upper driving electric motor 22 is fixed to the first upper roller 23 or the second upper roller 203, at least one of the first lower roller 44 and the second lower roller 404 is driven by a lower driving electric motor 42; a housing of the lower driving electric motor 42 is fixed onto the first lower driving bracket 43 or the second lower driving bracket 403, and a rotating shaft of the lower driving electric motor 42 is fixed to the first lower roller 44 or the second lower roller 404, the first upper roller 23 and the second upper roller 203 only can roll back and forth along the upper guide rail 21, and the first lower roller 44 and the second lower roller 404 only can roll back and forth along the lower guide rail 41;

an upper connecting rod 20, wherein two ends of the upper connecting rod 20 are fixed to the first upper driving bracket 24 and the second upper driving bracket 204, respectively;

a lower connecting rod 40, wherein two ends of the lower connecting rod 40 are fixed to the first lower driving bracket 43 and the second lower driving bracket 403, respectively;

a first vertical movement driving device 1, wherein the first vertical movement driving device 1 is provided with a first vertical sliding block 12, the first vertical movement driving device 1 can control the first vertical sliding block 12 to move up and down only along the first vertical rod 11, and the first vertical sliding block 12 is fixed with a first vertical movement bracket 19;

a second vertical movement driving device, wherein the second vertical movement driving device is provided with a second vertical sliding block 102, the second vertical movement driving device can control the second vertical sliding block 102 to move up and down only along the second vertical rod 101, and the second vertical sliding block 102 is fixed with a second vertical movement bracket 109;

a loading and unloading device 3, wherein the loading and unloading device 3 is provided with a loading and unloading rack 30, two corresponding sides of the loading and unloading rack 30 are hinged to the first vertical movement bracket 19 and the second vertical movement bracket 109 respectively, and in order to achieve balance and reliability, each side is provided with two hinging devices, and the loading and unloading device 3 can transport the bins 5 onto the goods rack to the loading and unloading rack 30; or the loading and unloading device 3 can transport the bins 5 on the loading and unloading rack 30 onto the goods rack;

a posture sensor 111, which is fixed on the first vertical rod 11 or the second vertical rod, wherein the posture sensor 111 can collect inclination angles of the first vertical rod 11 and the second vertical rod 101; and a controller, wherein the controller is electrically connected to the upper driving electric motor 22, the lower driving electric motor 42, an electric control device of the first vertical movement driving device 1, an electric control device of the second vertical movement driving device, an electric control device of the loading and unloading device 3, the posture sensor 111 and a server respectively, the controller loads and unloads goods according to an instruction of the server, the controller further can control a displacement speed of the upper driving electric motor 22 and a displacement speed of the lower driving electric motor 42 according to a signal of the posture sensor 111 to remain synchronous, such that the first vertical rod 11 and the second vertical rod 101 can maintain postures thereof in a vertical direction when moving.

The electric control devices in the present disclosure mainly refer to various electric motors.

The upper connecting rod 20, the first upper driving bracket 24 and the second upper driving bracket 204 in the present disclosure may be connected into one piece; the lower connecting rod 40, the first lower driving bracket 43 and the second lower driving bracket 403 also may be connected into one piece; the upper connecting rod 20 of the one piece, the lower connecting rod 40 of the one piece, the first vertical rod 11 and the second vertical rod 101 constitute a parallelogram structure, and the parallelogram can be deformed into a diamond shape according to change of heights of the upper guide rail 21 and the lower guide rail 41. In the present disclosure, the bins can be transported through the guide rails inclined at a large angle, for example, transported from the second floor to the first floor along a staircase.

It should be noted that, in order to show structures of the present disclosure more clearly, the goods rack is omitted in the drawings, and only one bottom plate 50 of the goods rack is shown in the drawings. The goods rack referred to in the present disclosure generally has a multi-layer structure, multiple bins can be placed on each layer, each bin has a designated number, and a computer can know a position of the number and goods stored. It is also feasible to provide multiple goods shelves, each goods rack is fixed with the upper guide rail 21 and the lower guide rail 41, and these upper guide rails 21 and lower guide rails 41 are connected directly or by transition sections, wherein the transition sections may be straight sections or curved sections. The goods loading and unloading apparatus in the present disclosure can travel to the upper guide rail 21 and the lower guide rail 41 of any goods rack.

It should also be noted that, after the loading and unloading rack 30 is lifted to a predetermined height, the goods may be carried and transferred by a robot's manipulator, for example, the robot transfers the goods from a sorting place to the loading and unloading rack 30, or the goods on the goods rack are picked up by the robot from the loading and unloading rack 30, and then directly transferred to a packaging station for packaging. When the robot performs the transferring, the robot may transfer the goods separately, and also may transfer the bin and the goods together. Since the upper guide rail 21 and the lower guide rail 41 may be directly fixed to the goods rack, the robot can shuttle between the goods shelves through the ground, and the robot is wirelessly connected to the computer.

Finally, it should be noted that the goods loading and unloading apparatus in the related art controls the upper driving electric motor 22 and the lower driving electric motor 42 only by the controller, which can hardly ensure synchronous rolling of the upper roller and the lower roller, and a non-synchronization result causes inclination of the vertical rods, unstable operation, increased power consumption, incapability of speeding up and so on. By providing the posture sensor 111, rotation speeds of the upper driving electric motor 22 and the lower driving electric motor 42 can be adjusted in time, and the vertical rod 11 can maintain the vertical posture. The posture sensor 39 is a high-performance three-dimensional movement posture measurement system based on MEMS technology, and some functions thereof are used in the present disclosure.

Figure 4:
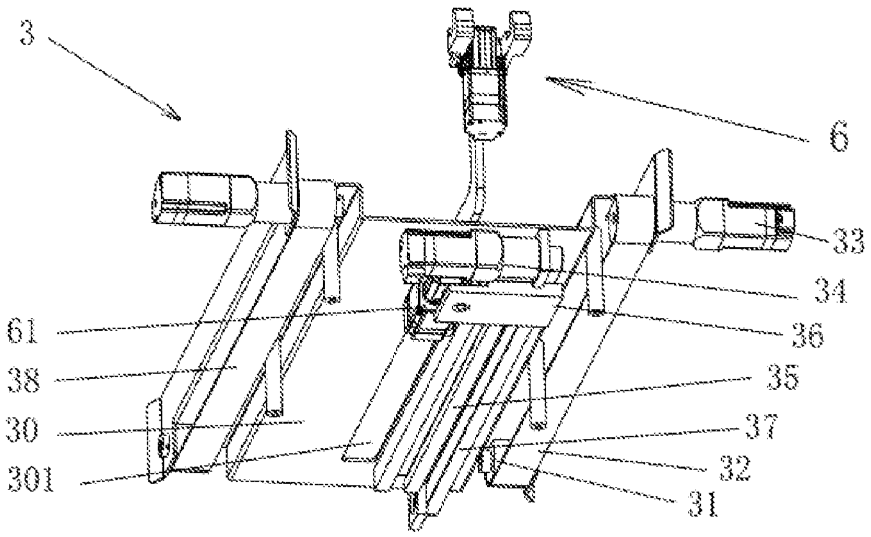
FIG. 4 is a bottom view showing internal structures of a loading and unloading device of the present disclosure.
Figure 5:
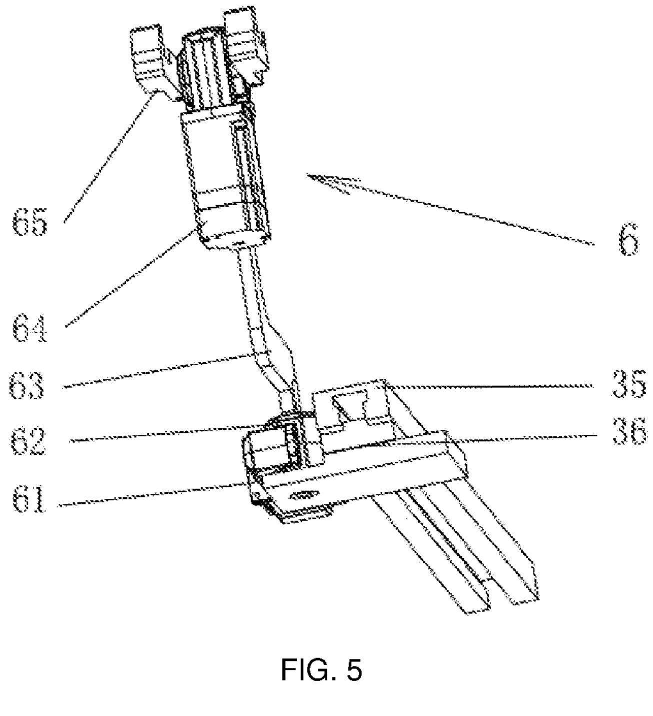
FIG. 5 is a related perspective view of a gripping device of the present disclosure.

Optionally, as shown in FIG. 3 to FIG. 5, the loading and unloading device 3 includes:

- a sliding rail 35, wherein the sliding rail 35 is fixed on the loading and unloading rack 30, and in the present embodiment, fixed below the loading and unloading rack 30;
- a loading and unloading sliding block 36, wherein the loading and unloading sliding block 36 only can move along the sliding rail 35;
- a dragging assembly, wherein the dragging assembly controls the loading and unloading sliding block 36 to move by a dragging electric motor 34; and
- a gripping device 6, wherein the gripping device 6 is provided with:
- a swing electric motor 61, wherein a housing of the swing electric motor 61 is fixed to the loading and unloading sliding block 36;
- a speed reducer 62, wherein a housing of the speed reducer 62 is fixed to the loading and unloading sliding block 36, and an input shaft of the speed reducer 62 is coupled to a rotating shaft of the swing electric motor 61;
- a swing rod 63 in an L shape, wherein one end of the swing rod 63 is fixed to an output shaft of the speed reducer 62;
- a gripping electric motor 64, wherein a housing of the gripping electric motor 64 is fixed to the other end of the swing rod 63; and
- a gripping hook 65, wherein the gripping hook 65 is fixed to a rotating shaft of the gripping electric motor 64, the loading and unloading rack 30 is provided with an elongated slot 301, and the swing rod 63 penetrates out from the elongated slot 301, wherein
- the dragging electric motor 34, the swing electric motor 61 and the gripping electric motor 64 are electrically connected to the controller, respectively; and
- the controller controls, via the swing electric motor 61, the swing rod 63 to swing towards either of the two goods shelves, controls, via the gripping electric motor 64, the gripping hook 65 to grasp an edge of the bin 5, and can, via the dragging electric motor 34, drag a designated bin 5 onto the loading and unloading rack 30, or push the bin 5 on the loading and unloading rack 30 to a designated position in the goods rack.

The dragging assembly in the above embodiment includes:

- the dragging electric motor 34, wherein a housing of the dragging electric motor 34 is fixed to the loading and unloading rack 30, and a main shaft of the dragging electric motor 34 is fixed with a dragging driving wheel;
- a dragging driven wheel, wherein a shaft core of the dragging driven wheel is fixed to the loading and unloading rack 30; and
- a dragging belt 37, wherein the dragging belt 37 is coupled to the dragging driving wheel and the dragging driven wheel, and the dragging belt 37 is fixed to the loading and unloading sliding block 36.

It should be noted that two adjacent goods shelves may share one loading and unloading device 3, and the loading and unloading device 3 is designed to be capable of loading goods to either of the two goods shelves or unloading goods from either of the two goods shelves, which may save the cost.

The speed reducer may be connected in series between the gripping hook 65 and the gripping electric motor 64.

A synchronous belt may be chosen as the dragging belt 37, and synchronous pulleys may be chosen as the dragging driving wheel and the dragging driven wheel.

The sliding rail 35 may be designed as a dovetail groove, and the loading and unloading sliding block 36 may be designed as a dovetail block, so as to ensure that the loading and unloading sliding block 36 slides in the sliding rail 35 and does not fall down. The sliding rail 35 further may be designed as a T-shaped groove, a part of the loading and unloading sliding block 36 may be shaped as a T-shaped block, and the T-shaped block can slide in the T-shaped groove, so as to ensure that the loading and unloading sliding block 36 slides in the sliding rail 35 and does not fall down.

It should also be noted that, in FIG. 1 to FIG. 4, a first conveying belt 32 and a second conveying belt 38 may be omitted, and the bins 5 are directly dragged onto the loading and unloading rack 30.

Finally, it should be noted that two edges of each bin 5 in the present disclosure are provided with through-holes 51 that need to be used when carrying the bin by a hand, the gripping hook 65 may hook the through-holes 51 for dragging, and the gripping hook 65 also may hook a flanging edge of the bin 5 in a vertical direction for dragging.

Optionally, the loading and unloading device 3 further includes:

- a first conveying driven wheel 31, wherein a shaft core of the first conveying driven wheel 31 is fixed to the loading and unloading rack 30;
- a first conveying electric motor 33, wherein a housing of the first conveying electric motor 33 is fixed to the loading and unloading rack 30, and a rotating shaft of the first conveying electric motor 33 is fixed with the first conveying driving wheel;
- a first conveying belt 32, wherein the first conveying belt 32 is coupled to the first conveying driven wheel 31 and the first conveying driving wheel;
- a second conveying driven wheel, wherein a shaft core of the second conveying driven wheel is fixed to the loading and unloading rack 30 and is located above the loading and unloading rack 30;
- a second conveying electric motor, wherein a housing of the second conveying electric motor is fixed to the loading and unloading rack 30, and a main shaft of the second conveying electric motor is fixed with a second conveying driving wheel; and
- a second conveying belt 38, wherein the second conveying belt 38 is coupled to the second conveying driven wheel and the second conveying driving wheel, the second conveying belt 38 is provided in parallel with the first conveying belt 32, and driving parts of the second conveying belt 38 and the first conveying belt 32 may be of symmetrical structures, wherein
- the first conveying electric motor 33 and the second conveying electric motor are electrically connected to the controller, respectively; and
- under the control of the controller, the bin 5 can be dragged onto the first conveying belt 32 and the second conveying belt 38, the gripping hook 65, after being disengaged from the bin 5, is swung away from the bin 5 via the swing rod 63, and then the bin 5 is transported to a central position of the loading and unloading rack 30 by the first conveying belt 32 and the second conveying belt 38.

It should be noted that when the loading and unloading device 3 is not mounted with the first conveying belt 32 and the second conveying belt 38, the loading and unloading rack 30 needs to be relatively long, so as to ensure that the bin 5 is transported to the center of the loading and unloading rack 30. After the first conveying belt 32 and the second conveying belt 38 are mounted, a length of the loading and unloading rack 30 may be shortened, that is to say, a gap between two adjacent goods shelves may be reduced, which can greatly improve storage density of the goods shelves.

Generally, after a half of the bin 5 is dragged onto the first conveying belt 32 and the second conveying belt 38, the transportation of the bin 5 to the central position of the loading and unloading rack 30 may be completed by the first conveying belt 32 and the second conveying belt 38 themselves.

Similarly, the first conveying belt 32 and the second conveying belt 38 may be synchronous belts, and correspondingly, the conveying driven wheel and the conveying driving wheel may be synchronous pulleys.

In the present disclosure, the loading and unloading rack 30 is fixed to a loading and unloading bottom plate, the loading and unloading bottom plate is hinged to the first vertical movement bracket 19 and the second vertical movement bracket 109, and it is also feasible that the loading and unloading rack 30 is directly hinged to the first vertical movement bracket 19 and the second vertical movement bracket 109.

Figure 6:
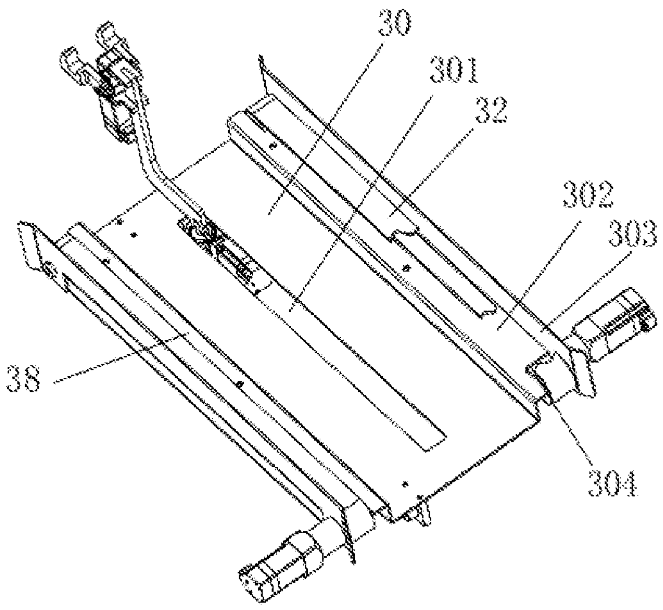
FIG. 6 is a top view of the loading and unloading device of the present disclosure.

Optionally, as shown in FIG. 6, two sides of the loading and unloading rack 30 are bent upwards to form a first horizontal step 302 and a second horizontal step that are symmetrical. The first horizontal step 302 is connected upwards to a first vertical surface 303. The second horizontal step is connected upwards to a second vertical surface. Two ends of the first horizontal step 302 are respectively cut to form first notches 304, and sheets cut from the first notches 304 are connected to the first vertical surface 303. Two ends of the second horizontal step are respectively cut to form second notches, and sheets cut from the second notches are connected to the second vertical surface. The first conveying driving wheel and the first conveying driven wheel 31 are located in the first notches 304, respectively. The shaft cores of the first conveying driving wheel and the first conveying driven wheel 31 are fixed on the first vertical surface 303, respectively. The second conveying driving wheel and the second conveying driven wheel are located in the second notches, respectively. The second conveying driving wheel and the second conveying driven wheel are fixed on the second vertical surface, respectively. The first conveying belt 32 surrounds the first horizontal step 302, and the second conveying belt 38 surrounds the second horizontal step.

In this technical solution, the loading and unloading rack 30 may be formed by bending a piece of sheet metal, which has the advantages of a compact structure, a high strength, and a light weight.

Slip sheets (sliding blades) may be fixed between the horizontal steps and the first conveying belt 32 and the second conveying belt 38, so as to reduce wear to the belts while supporting weights of the belts.

The arrangement of the first vertical surface 303 and the second vertical surface can ensure that the bin does not slide out from two sides.

Optionally, as shown in FIGS. 1-3, the first upper driving bracket 24 or the first lower driving bracket 43 is provided with a first elastic force-dividing device, and the second upper driving bracket 204 or the second lower driving bracket 403 is provided with a second elastic force-dividing device, wherein the first elastic force-dividing device can ensure that when the first upper roller 23 and the first lower roller 44 are rolling, the two rollers always share certain weights; and the second elastic force-dividing device can ensure that when the second upper roller 203 and the second lower roller 404 are rolling, the two rollers always share certain weights.

Optionally, the first elastic force-dividing device includes:

a first upper hinging disk 25, wherein the first upper hinging disk 25 is provided with a first annular groove, the first upper hinging disk 25 is fixed to the first vertical rod 11, the first upper driving bracket 24 is partially embedded into the first annular groove and hinged to the first upper hinging disk 25, and the first upper driving bracket 24 can move up and down for a certain distance relative to the first upper hinging disk 25; and a first force-dividing tension spring 26, wherein one end of the first force-dividing tension spring 26 is fixed to the first upper driving bracket 24, and the other end of the first force-dividing tension spring 26 is fixed to the first vertical rod 11.

The second elastic force-dividing device includes:

a second upper hinging disk 205, wherein the second upper hinging disk 205 is provided with a second annular groove, the second upper hinging disk 205 is fixed to the second vertical rod 101, the second upper driving bracket 204 is partially embedded into the second annular groove and hinged to the second upper hinging disk 205, and the second upper driving bracket 204 can move up and down for a certain distance relative to the second upper hinging disk 205; and a second force-dividing tension spring 206, wherein one end of the second force-dividing tension spring 206 is fixed to the second upper driving bracket 204, and the other end of the second force-dividing tension spring 206 is fixed to the second vertical rod 101.

It should be noted that, the mounting and fixation of the upper guide rail 21 and the lower guide rail 41 as well as the upper roller and the lower roller cannot guarantee absolute size accuracy, while the elastic force-dividing devices can ensure that the upper roller and the lower roller can always share certain weights, thus avoiding the upper roller or the lower roller rising into the air, to cause decreased rolling friction, idling of the rollers, and incapability of speeding up.

It should be further noted that, the first upper driving bracket 24 is provided with a long hole, wherein the long hole can move up and down for a certain distance relative to the first annular groove of the first upper hinging disk 25; and the second upper driving bracket 204 is provided with a long hole, wherein the long hole can move up and down for a certain distance relative to the second annular groove of the second upper hinging disk 205.

Obviously, the elastic force-dividing devices further may be mounted only on the lower driving bracket 24, and principle is the same.

Figure 9:
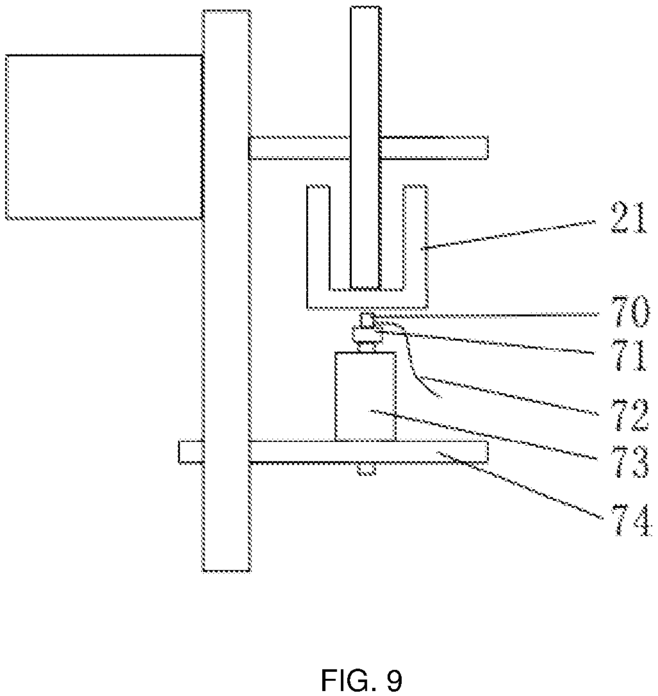
FIG. 9 is a schematic diagram of a charging structure of the present disclosure.

Optionally, as shown in FIG. 9, the upper guide rail 21 and the lower guide rail 41 are electrically insulated from the goods rack, the first vertical rod 11 and the second vertical rod 101, and the upper guide rail 21 and the lower guide rail 41 are electrically connected to a positive pole and a negative pole of a charger, respectively.

The goods loading and unloading apparatus further includes:

an upper electromagnet coil 73, wherein the upper electromagnet coil 73 is fixed to the first upper driving bracket 24 or the second upper driving bracket 204 by an upper charging bracket 74, an iron core of the upper electromagnet coil 73 is fixed with an upper electrode 70 via an upper insulating material 71, and the upper electrode 70 is electrically connected to a positive pole of a rechargeable battery in the controller via an upper flexible wire 72, the upper electromagnet coil 73 is electrically connected to the controller, and when the first upper roller 23 does not rotate, the upper electromagnet coil 73 performs attracting and charging; and a lower electromagnet coil, wherein the lower electromagnet coil is fixed to the first lower driving bracket 43 or the second lower driving bracket 403 via a lower charging bracket, an iron core of the lower electromagnet coil is fixed with a lower electrode via a lower insulating material, the lower electrode is electrically connected to a negative pole of the rechargeable battery in the controller via a lower flexible wire, the lower electromagnet coil is electrically connected to the controller, and when the first lower roller 44 does not rotate, the lower electromagnet coil performs attracting and charging.

This technical solution can make the rechargeable battery obtain electric energy in time, and maintain sufficient electric power.

Figure 7:
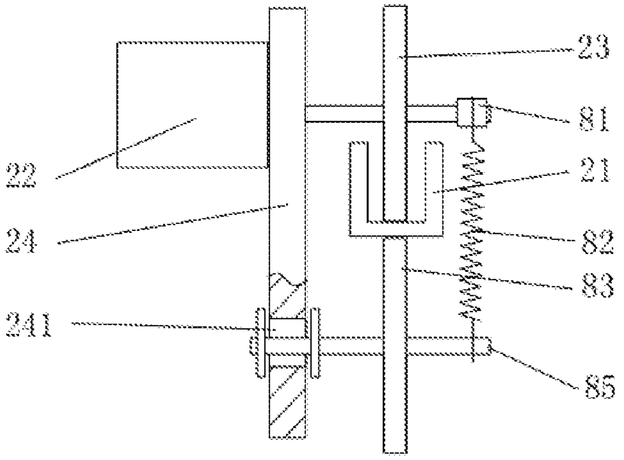
FIG. 7 is a structural schematic diagram of a rolling friction increasing device of the present disclosure.

Optionally, as shown in FIG. 7, the first upper roller 23 or the second upper roller 203 is provided with a first rolling friction increasing device, wherein the first rolling friction increasing device can increase friction force between the first upper roller 23 and the upper guide rail 21 or between the second upper roller 203 and the upper guide rail 21, and the first lower roller 44 or the second lower roller 404 is provided with a second rolling friction increasing device, wherein the second rolling friction increasing device can increase friction force between the first lower roller 44 and the lower guide rail 41 or between the second lower roller 404 and the lower guide rail 41.

The first rolling friction increasing device includes:

an upper friction assisted wheel 83, wherein the upper friction assisted wheel 83 is rotatably coupled to an upper fixed shaft 85, and the first upper driving bracket 24 is provided with a first elongated slot 241 configured for fixing the upper fixed shaft 85 and capable of swinging up and down;

an upper shaft sleeve 81, wherein the upper shaft sleeve 81 is sleeved over the rotating shaft of the upper driving electric motor 22; and an upper friction increasing tension spring 82, wherein one end of the upper friction increasing tension spring 82 is coupled to the upper fixed shaft 85, and the other end of the upper friction increasing tension spring 82 is coupled to the upper shaft sleeve 81.

The second rolling friction increasing device includes:

a lower friction assisted wheel, wherein the lower friction assisted wheel is rotatably coupled to the lower fixed shaft, and the first lower driving bracket 43 is provided with a second elongated slot configured for fixing the lower fixed shaft and capable of swinging up and down;

a lower shaft sleeve, wherein the lower shaft sleeve is sleeved over the rotating shaft of the lower driving electric motor 42; and a lower friction increasing tension spring, wherein one end of the lower friction increasing tension spring is coupled to the lower fixed shaft, and the other end of the lower friction increasing tension spring is coupled to the lower shaft sleeve.

It should be noted that, in order to improve a transportation speed, the friction force between the upper roller and the upper guide rail 21 and the friction force between the lower roller and the lower guide rail 41 need to be increased. However, the friction force increased by a single-wheel structure or a double-wheel structure is limited. In the present disclosure, the friction force can be significantly increased by adding the friction assisted wheels, so that the transportation speed can be improved.

Figure 8:
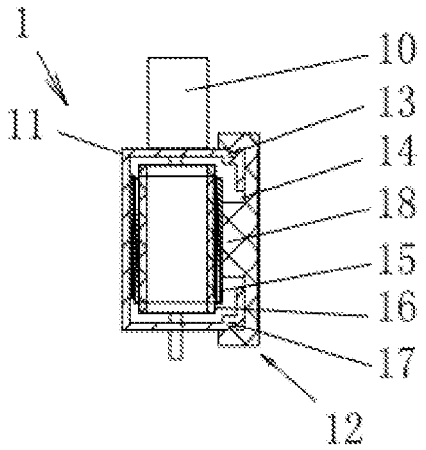
FIG. 8 is a structural schematic diagram of a vertical movement driving device of the present disclosure.

Optionally, as shown in FIG. 8, the first vertical movement driving device 1 includes:

the first vertical rod 11, wherein the first vertical rod 11 is of a hollow structure, the first vertical rod 11 is provided with a first open end 14, and two side surfaces of the first vertical rod 11 are each provided with a first groove 17;

a first synchronous pulley 16 and a second synchronous pulley, wherein the first synchronous pulley 16 and the second synchronous pulley may be rotatably fixed to two ends inside the first vertical rod 11, respectively;

a first synchronous belt 15, wherein the first synchronous belt 15 is wound outside the first synchronous pulley 16 and the second synchronous pulley;

a first vertical movement driving electric motor 10, wherein a housing of the first vertical movement driving electric motor 10 is fixed to the first vertical rod 11, a rotating shaft thereof is fixed to a central shaft of the first synchronous pulley 16 or the second synchronous pulley, and the first vertical movement driving electric motor 10 is electrically connected to the controller; and the first vertical sliding block 12, wherein the first vertical sliding block 12 is provided with a first bump 18 and two first guide blocks 13, the first bump 18 can be embedded into the first open end 14 of the first vertical rod 11 and be fixed to the first synchronous belt 15, and the first guide blocks 13 can move up and down only along the first groove 17.

The second vertical movement driving device includes:

the second vertical rod 101, wherein the second vertical rod 101 is of a hollow structure, the second vertical rod 101 is provided with a second open end, and two side surfaces of the second vertical rod 101 are each provided with a second groove;

a third synchronous pulley and a fourth synchronous pulley, wherein the third synchronous pulley and the fourth synchronous pulley are rotatably fixed to two ends inside the second vertical rod 101, respectively;

a second synchronous belt, wherein the second synchronous belt is wound outside the third synchronous pulley and the fourth synchronous pulley;

a second vertical movement driving electric motor, wherein a housing of the second vertical movement driving electric motor is fixed to the second vertical rod 101, a rotating shaft of the second vertical movement driving electric motor is fixed to a central shaft of the third synchronous pulley or the fourth synchronous pulley, and the second vertical movement driving electric motor is electrically connected to the controller; and the second vertical sliding block 102, wherein the second vertical sliding block 102 is provided with a second bump and two second guide blocks, and wherein the second bump can be embedded into the second open end of the second vertical rod 101 and be fixed to the second synchronous belt, and the second guide blocks can move up and down only along the second groove.

Structures of the first vertical movement driving device 1 and the second vertical movement driving device are completely the same, which can reduce a manufacturing cost.

Figure 10:
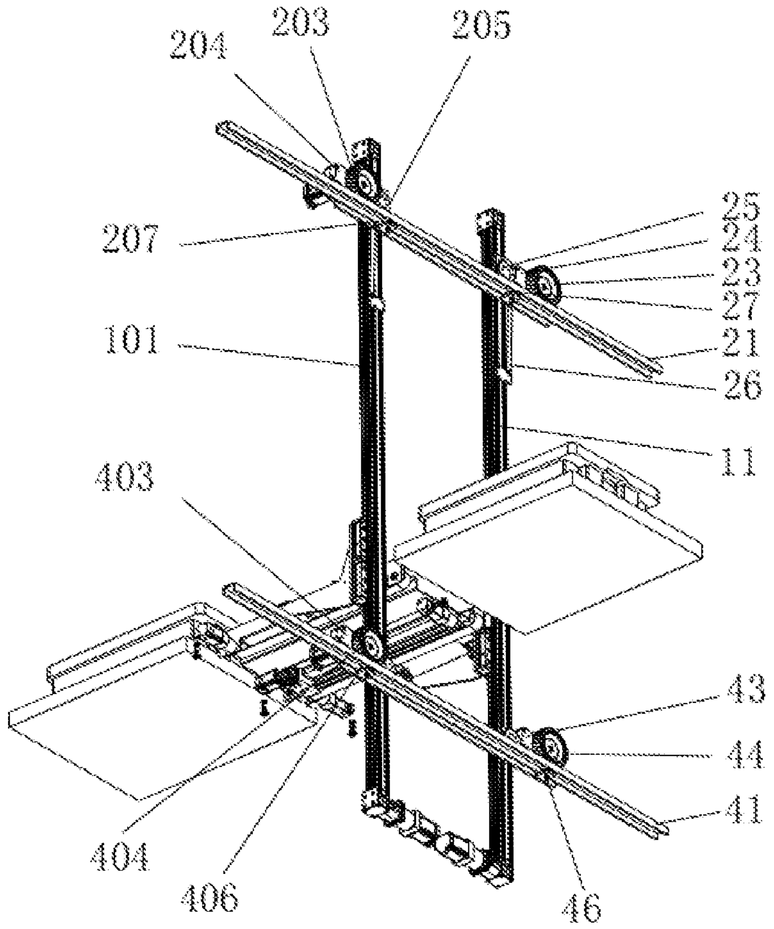
FIG. 10 is a schematic diagram showing inverted U shape-related structures of guide rails of the present disclosure.

Optionally, as shown in FIG. 10, cross sections of the upper guide rail 21 and the lower guide rail 41 are in an inverted U shape, the first upper roller 23 and the second upper roller 203 roll on a top surface of the upper guide rail 21, and the first lower roller 44 and the second lower roller 404 roll on a top surface of the lower guide rail 41. The goods loading and unloading apparatus further includes:

a first upper guiding wheel 27, wherein a shaft core of the first upper guiding wheel 27 is fixed to the first upper driving bracket 24 via a first upper guiding bracket;

a second upper guiding wheel 207, wherein a shaft core of the second upper guiding wheel 207 is fixed to the second upper driving bracket 204 via a second upper guiding bracket, wherein the first upper guiding wheel 27 and the second upper guiding wheel 207 are inserted into the upper guide rail 21, and can roll to touch either of two side walls of the guide rail 21;

a first lower guiding wheel 46, wherein a shaft core of the first lower guiding wheel 46 is fixed to the first lower driving bracket 43 via a first lower guiding bracket; and a second lower guiding wheel 406, wherein a shaft core of the second lower guiding wheel 406 is fixed to the second lower driving bracket 403 via a second lower guiding bracket, wherein the first lower guiding wheel 46 and the second lower guiding wheel 406 are inserted into the lower guide rail 21, and can roll to touch one of the two side walls of the lower guide rail 21.

In the present embodiment, different from FIG. 1 in which the cross sections of the upper guide rail 21 and the lower guide rail 41 are of a U-shaped structure, the cross sections of the upper guide rail 21 and the lower guide rail 41 in the present embodiment are each of an inverted U shape, the advantage of which is that sundries will not be accumulated on the top surfaces of the upper guide rail 21 and the lower guide rail 41 and cleaning is omitted, while in FIG. 1, sundries tend to be accumulated on the upper guide rail 21 and the lower guide rail 41 and need to be cleaned up.

In both FIG. 1 and FIG. 10, the guiding wheels are provided, and the guiding wheels can ensure that the upper rollers and the lower rollers travel centrally along the guide rails.

Servo electric motors with a speed reducer may be chosen as various electric motors of the present disclosure in the above, enabling high control accuracy.

The controller in the present disclosure may be fixed to the bottom or other positions of the loading and unloading rack 30, electrically connected to various electric motors and the posture sensor via flexible cables, and wirelessly connected to the server.

INDUSTRIAL APPLICABILITY

The present disclosure discloses a goods loading and unloading apparatus fixed on a goods rack, which may include: a first vertical rod, which is mounted with a first vertical sliding block driven by a first vertical movement driving device, a first upper roller, and a first lower roller driven by a lower driving electric motor; a second vertical rod, which is mounted with a second vertical sliding block driven by a second vertical movement driving device, a second lower roller and a second upper roller driven by an upper driving electric motor, wherein the upper rollers and the lower rollers move along the upper guide rail and the lower guide rail, respectively; a loading and unloading device, hinged to the first vertical sliding block and the second vertical sliding block respectively, and movable to a designated position of the goods rack to load and unload goods; and a posture sensor, which is fixed on the first vertical rod for collecting an inclination angle, wherein the controller can control a displacement speed of the upper driving electric motor and a displacement speed of the lower driving electric motor to remain synchronous, so that the first vertical rod and the second vertical rod can maintain postures thereof in a vertical direction when moving. The present disclosure has the beneficial effects of a small occupied area, a large load capacity, a fast goods loading and unloading speed and power consumption reduction.

Besides, it may be understood that the goods loading and unloading apparatus fixed on a goods rack in the present disclosure may be reproduced, and may be used in a variety of industrial applications. For example, the goods loading and unloading apparatus fixed on a goods rack in the present disclosure may be used in the technical field of apparatuses for loading and unloading goods.

What is claimed is:

1. A goods loading and unloading apparatus configured to be fixed on at least one goods rack, wherein the goods loading and unloading apparatus comprises:

an upper guide rail and a lower guide rail, wherein the upper guide rail and the lower guide rail are respectively fixed to an upper portion and a lower portion of each of the at least one goods rack, the upper guide rail and the lower guide rail are provided in parallel, the goods rack is configured to store at least one bin therein, and the at least one bin is configured to store goods;

a first vertical rod, wherein an upper portion of the first vertical rod is hinged to a first upper driving bracket, the first upper driving bracket is provided with a first upper roller, a lower portion of the first vertical rod is hinged to a first lower driving bracket, and the first lower driving bracket is provided with a first lower roller;

a second vertical rod, wherein an upper portion of the second vertical rod is hinged to a second upper driving bracket, the second upper driving bracket is provided with a second upper roller, a lower portion of the second vertical rod is hinged to a second lower driving bracket, and the second lower driving bracket is provided with a second lower roller, at least one of the first upper roller and the second upper roller is configured to be driven by an upper driving electric motor, at least one of the first lower roller and the second lower roller is configured to be driven by a lower driving electric motor, the first upper roller and the second upper roller are configured to roll back and forth only along the upper guide rail; and the first lower roller and the second lower roller are configured to roll back and forth only along the lower guide rail;

an upper connecting rod, wherein two ends of the upper connecting rod are fixed to the first upper driving bracket and the second upper driving bracket, respectively;

a lower connecting rod, wherein two ends of the lower connecting rod are fixed to the first lower driving bracket and the second lower driving bracket, respectively;

a first vertical movement driving device, wherein the first vertical movement driving device is provided with a first vertical sliding block, the first vertical movement driving device is configured to control the first vertical sliding block to move up and down only along the first vertical rod, and the first vertical sliding block is fixed with a first vertical movement bracket;

a second vertical movement driving device, wherein the second vertical movement driving device is provided with a second vertical sliding block, the second vertical movement driving device is configured to control the second vertical sliding block to move up and down only along the second vertical rod, and the second vertical sliding block is fixed with a second vertical movement bracket;

a loading and unloading device, wherein the loading and unloading device is provided with a loading and unloading rack, two corresponding sides of the loading and unloading rack are hinged to the first vertical movement bracket and the second vertical movement bracket respectively, and the loading and unloading device is configured to transport the at least one bin on the goods rack onto the loading and unloading rack, or transport the at least one bin on the loading and unloading rack onto the goods rack;

a posture sensor, wherein the posture sensor is fixed on the first vertical rod or the second vertical rod, and the posture sensor is configured to collect inclination angles of the first vertical rod and the second vertical rod; and a controller, wherein the controller is electrically connected to the upper driving electric motor, the lower driving electric motor, an electric control device of the first vertical movement driving device, an electric control device of the second vertical movement driving device, an electric control device of the loading and unloading device, the posture sensor and a server respectively, the controller is configured to load and unload goods according to an instruction of the server, the controller is further configured to control, according to a signal of the posture sensor, a displacement speed of the upper driving electric motor and a displacement speed of the lower driving electric motor to remain synchronous, such that the first vertical rod and the second vertical rod can maintain postures thereof in a vertical direction when moving.

2. The goods loading and unloading apparatus according to claim 1, wherein the loading and unloading device comprises:

a sliding rail, wherein the sliding rail is fixed on the loading and unloading rack;

a loading and unloading sliding block, wherein the loading and unloading sliding block is configured to move only along the sliding rail;

a dragging assembly, wherein the dragging assembly is configured to control the loading and unloading sliding block to move by a dragging electric motor; and a gripping device, wherein the gripping device is provided with:

a swing electric motor, wherein a housing of the swing electric motor is fixed to the loading and unloading sliding block;

a speed reducer, wherein a housing of the speed reducer is fixed to the loading and unloading sliding block, and an input shaft of the speed reducer is coupled to a rotating shaft of the swing electric motor;

a swing rod, wherein the swing rod is in an L shape, and one end of the swing rod is fixed to an output shaft of the speed reducer;

a gripping electric motor, wherein a housing of the gripping electric motor is fixed to the other end of the swing rod; and a gripping hook, wherein the gripping hook is fixed to a rotating shaft of the gripping electric motor, the loading and unloading rack is provided with an elongated slot, and the swing rod penetrates out from the elongated slot, wherein the dragging electric motor, the swing electric motor and the gripping electric motor are electrically connected to the controller, respectively; and the controller is configured to control the swing rod via the swing electric motor to swing towards either of two goods shelves, control the gripping hook via the gripping electric motor to grasp an edge of one of the at least one bin, and drag, via the dragging electric motor, a designated bin onto the loading and unloading rack, or push the bin on the loading and unloading rack to a designated position in the goods rack.

3. The goods loading and unloading apparatus according to claim 2, wherein the dragging assembly comprises:

the dragging electric motor, wherein a housing of the dragging electric motor is fixed to the loading and unloading rack, and a main shaft of the dragging electric motor is fixed with a dragging driving wheel;

a dragging driven wheel, wherein a shaft core of the dragging driven wheel is fixed to the loading and unloading rack; and a dragging belt, wherein the dragging belt is coupled to the dragging driving wheel and the dragging driven wheel, and the dragging belt is fixed to the loading and unloading sliding block.

4. The goods loading and unloading apparatus according to claim 3, wherein the loading and unloading device further comprises:

a first conveying driven wheel, wherein a shaft core of the first conveying driven wheel is fixed to the loading and unloading rack;

a first conveying electric motor, wherein a housing of the first conveying electric motor is fixed to the loading and unloading rack, and a rotating shaft of the first conveying electric motor is fixed with the first conveying driving wheel;

a first conveying belt, wherein the first conveying belt is coupled to the first conveying driven wheel and the first conveying driving wheel;

a second conveying driven wheel, wherein a shaft core of the second conveying driven wheel is fixed to the loading and unloading rack and is located above the loading and unloading rack;

a second conveying electric motor, wherein a housing of the second conveying electric motor is fixed to the loading and unloading rack, and a main shaft of the second conveying electric motor is fixed with a second conveying driving wheel; and a second conveying belt, wherein the second conveying belt is coupled to the second conveying driven wheel and the second conveying driving wheel, and the second conveying belt is provided in parallel with the first conveying belt, wherein the first conveying electric motor and the second conveying electric motor are electrically connected to the controller, respectively; and under control of the controller, the bin can be dragged onto the first conveying belt and the second conveying belt, the gripping hook, after being disengaged from the bin, is swung away from the bin via the swing rod, and then the bin is transported to a central position of the loading and unloading rack by the first conveying belt and the second conveying belt.

5. The goods loading and unloading apparatus according to claim 4, wherein two sides of the loading and unloading rack are bent upwards to form a first horizontal step and a second horizontal step that are symmetrical, the first horizontal step is connected upwards to a first vertical surface, the second horizontal step is connected upwards to a second vertical surface, two ends of the first horizontal step are respectively cut to form first notches, sheets cut from the first notches are connected to the first vertical surface, two ends of the second horizontal step are respectively cut to form second notches, sheets cut from the second notches are connected to the second vertical surface, the first conveying driving wheel and the first conveying driven wheel are located in the first notches respectively, the shaft cores of the first conveying driving wheel and the first conveying driven wheel are fixed on the first vertical surface respectively, the second conveying driving wheel and the second conveying driven wheel are located in the second notches respectively, the second conveying driving wheel and the second conveying driven wheel are fixed on the second vertical surface respectively, the first conveying belt surrounds the first horizontal step, and the second conveying belt surrounds the second horizontal step.

6. The goods loading and unloading apparatus according to claim 3, wherein the dragging belt is a synchronous belt, and the dragging driving wheel and the dragging driven wheel are synchronous pulleys.

7. The goods loading and unloading apparatus according to claim 3, wherein the speed reducer is connected in series between the gripping hook and the gripping electric motor.

8. The goods loading and unloading apparatus according to claim 3, wherein the sliding rail is designed as a dovetail groove, and the loading and unloading sliding block is designed as a dovetail block, so that the loading and unloading sliding block slides in the sliding rail and does not fall down; or the sliding rail is designed as a T-shaped groove, a part of the loading and unloading sliding block is shaped as a T-shaped block, and the T-shaped block of the loading and unloading sliding block is slidable in the sliding rail of the T-shaped groove, so that the loading and unloading sliding block slides in the sliding rail and does not fall down.

9. The goods loading and unloading apparatus according to claim 2, wherein the speed reducer is connected in series between the gripping hook and the gripping electric motor.

10. The goods loading and unloading apparatus according to claim 9, wherein the loading and unloading device further comprises:

a first conveying driven wheel, wherein a shaft core of the first conveying driven wheel is fixed to the loading and unloading rack;

a first conveying electric motor, wherein a housing of the first conveying electric motor is fixed to the loading and unloading rack, and a rotating shaft of the first conveying electric motor is fixed with the first conveying driving wheel;

a first conveying belt, wherein the first conveying belt is coupled to the first conveying driven wheel and the first conveying driving wheel;

a second conveying driven wheel, wherein a shaft core of the second conveying driven wheel is fixed to the loading and unloading rack and is located above the loading and unloading rack;

a second conveying electric motor, wherein a housing of the second conveying electric motor is fixed to the loading and unloading rack, and a main shaft of the second conveying electric motor is fixed with a second conveying driving wheel; and a second conveying belt, wherein the second conveying belt is coupled to the second conveying driven wheel and the second conveying driving wheel, and the second conveying belt is provided in parallel with the first conveying belt, wherein the first conveying electric motor and the second conveying electric motor are electrically connected to the controller, respectively; and under control of the controller, the bin can be dragged onto the first conveying belt and the second conveying belt, the gripping hook, after being disengaged from the bin, is swung away from the bin via the swing rod, and then the bin is transported to a central position of the loading and unloading rack by the first conveying belt and the second conveying belt.

11. The goods loading and unloading apparatus according to claim 2, wherein the sliding rail is designed as a dovetail groove, and the loading and unloading sliding block is designed as a dovetail block, so that the loading and unloading sliding block slides in the sliding rail and does not fall down; or the sliding rail is designed as a T-shaped groove, a part of the loading and unloading sliding block is shaped as a T-shaped block, and the T-shaped block of the loading and unloading sliding block is slidable in the sliding rail of the T-shaped groove, so that the loading and unloading sliding block slides in the sliding rail and does not fall down.

12. The goods loading and unloading apparatus according to claim 2, wherein the first upper driving bracket or the first lower driving bracket is provided with a first elastic force-dividing device, and the second upper driving bracket or the second lower driving bracket is provided with a second elastic force-dividing device, wherein the first elastic force-dividing device is configured to ensure that when the first upper roller and the first lower roller are rolling, the first upper roller and the first lower roller always share certain weights; and the second elastic force-dividing device is configured to ensure that when the second upper roller and the second lower roller are rolling, the second upper roller and the second lower roller always share certain weights.

13. The goods loading and unloading apparatus according to claim 2, wherein the upper guide rail and the lower guide rail are electrically insulated from the goods rack, the first vertical rod and the second vertical rod, and the upper guide rail and the lower guide rail are electrically connected to a positive pole and a negative pole of a charger, respectively; and the goods loading and unloading apparatus further comprises:

an upper electromagnet coil, wherein the upper electromagnet coil is fixed to the first upper driving bracket or the second upper driving bracket by an upper charging bracket, an iron core of the upper electromagnet coil is fixed with an upper electrode via an upper insulating material, and the upper electrode is electrically connected to a positive pole of a rechargeable battery in the controller via an upper flexible wire, the upper electromagnet coil is electrically connected to the controller, and when the first upper roller does not rotate, the upper electromagnet coil performs attracting and charging; and a lower electromagnet coil, wherein the lower electromagnet coil is fixed to the first lower driving bracket or the second lower driving bracket via a lower charging bracket, an iron core of the lower electromagnet coil is fixed with a lower electrode via a lower insulating material, the lower electrode is electrically connected to a negative pole of the rechargeable battery in the controller via a lower flexible wire, the lower electromagnet coil is electrically connected to the controller, and when the first lower roller does not rotate, the lower electromagnet coil performs attracting and charging.

14. The goods loading and unloading apparatus according to claim 1, wherein the first upper driving bracket or the first lower driving bracket is provided with a first elastic force-dividing device, and the second upper driving bracket or the second lower driving bracket is provided with a second elastic force-dividing device, wherein the first elastic force-dividing device is configured to ensure that when the first upper roller and the first lower roller are rolling, the first upper roller and the first lower roller always share certain weights; and the second elastic force-dividing device is configured to ensure that when the second upper roller and the second lower roller are rolling, the second upper roller and the second lower roller always share certain weights.

15. The goods loading and unloading apparatus according to claim 14, wherein the first elastic force-dividing device comprises:

a first upper hinging disk, wherein the first upper hinging disk is provided with a first annular groove, the first upper hinging disk is fixed to the first vertical rod, the first upper driving bracket is partially embedded into the first annular groove and hinged to the first upper hinging disk, and the first upper driving bracket is configured to move up and down for a certain distance relative to the first upper hinging disk; and a first force-dividing tension spring, wherein one end of the first force-dividing tension spring is fixed to the first upper driving bracket, and the other end of the first force-dividing tension spring is fixed to the first vertical rod; and the second elastic force-dividing device comprises:

a second upper hinging disk, wherein the second upper hinging disk is provided with a second annular groove, the second upper hinging disk is fixed to the second vertical rod, the second upper driving bracket is partially embedded into the second annular groove and hinged to the second upper hinging disk, and the second upper driving bracket is configured to move up and down for a certain distance relative to the second upper hinging disk; and a second force-dividing tension spring, wherein one end of the second force-dividing tension spring is fixed to the second upper driving bracket, and the other end of the second force-dividing tension spring is fixed to the second vertical rod.

16. The goods loading and unloading apparatus according to claim 1, wherein the first upper roller or the second upper roller is provided with a first rolling friction increasing device, the first rolling friction increasing device is configured to increase friction force between the first upper roller and the upper guide rail or between the second upper roller and the upper guide rail, and the first lower roller or the second lower roller is provided with a second rolling friction increasing device, and the second rolling friction increasing device is configured to increase friction force between the first lower roller and the lower guide rail or between the second lower roller and the lower guide rail.

17. The goods loading and unloading apparatus according to claim 16, wherein the first rolling friction increasing device comprises:

an upper friction assisted wheel, wherein the upper friction assisted wheel is rotatably coupled to an upper fixed shaft, and the first upper driving bracket is provided with a first elongated slot configured for fixing the upper fixed shaft and capable of swinging up and down;

an upper shaft sleeve, wherein the upper shaft sleeve is sleeved on a rotating shaft of the upper driving electric motor; and an upper friction increasing tension spring, wherein one end of the upper friction increasing tension spring is coupled to the upper fixed shaft, and the other end of the upper friction increasing tension spring is coupled to the upper shaft sleeve; and the second rolling friction increasing device comprises:

a lower friction assisted wheel, wherein the lower friction assisted wheel is rotatably coupled to the lower fixed shaft, and the first lower driving bracket is provided with a second elongated slot configured for fixing the lower fixed shaft and capable of swinging up and down;

a lower shaft sleeve, wherein the lower shaft sleeve is sleeved over a rotating shaft of the lower driving electric motor; and a lower friction increasing tension spring, wherein one end of the lower friction increasing tension spring is coupled to the lower fixed shaft, and the other end of the lower friction increasing tension spring is coupled to the lower shaft sleeve.

18. The goods loading and unloading apparatus according to claim 1, wherein the upper guide rail and the lower guide rail are electrically insulated from the goods rack, the first vertical rod and the second vertical rod, and the upper guide rail and the lower guide rail are electrically connected to a positive pole and a negative pole of a charger, respectively; and the goods loading and unloading apparatus further comprises:

an upper electromagnet coil, wherein the upper electromagnet coil is fixed to the first upper driving bracket or the second upper driving bracket by an upper charging bracket, an iron core of the upper electromagnet coil is fixed with an upper electrode via an upper insulating material, and the upper electrode is electrically connected to a positive pole of a rechargeable battery in the controller via an upper flexible wire, the upper electromagnet coil is electrically connected to the controller, and when the first upper roller does not rotate, the upper electromagnet coil performs attracting and charging; and a lower electromagnet coil, wherein the lower electromagnet coil is fixed to the first lower driving bracket or the second lower driving bracket via a lower charging bracket, an iron core of the lower electromagnet coil is fixed with a lower electrode via a lower insulating material, the lower electrode is electrically connected to a negative pole of the rechargeable battery in the controller via a lower flexible wire, the lower electromagnet coil is electrically connected to the controller, and when the first lower roller does not rotate, the lower electromagnet coil performs attracting and charging.

19. The goods loading and unloading apparatus according to claim 1, wherein the first vertical movement driving device comprises:

the first vertical rod, wherein the first vertical rod is of a hollow structure, the first vertical rod is provided with a first open end, and two side surfaces of the first vertical rod are each provided with a first groove;

a first synchronous pulley and a second synchronous pulley, wherein the first synchronous pulley and the second synchronous pulley are rotatably fixed to two ends inside the first vertical rod, respectively;

a first synchronous belt, wherein the first synchronous beltis wound outside the first synchronous pulley and the second synchronous pulley;

a first vertical movement driving electric motor, wherein a housing of the first vertical movement driving electric motor is fixed to the first vertical rod, a rotating shaft of the first vertical movement driving electric motor is fixed to a central shaft of the first synchronous pulley or the second synchronous pulley, and the first vertical movement driving electric motor is electrically connected to the controller; and the first vertical sliding block, wherein the first vertical sliding block is provided with a first bump and two first guide blocks, the first bump is configured to be embedded into the first open endof the first vertical rod and be fixed to the first synchronous belt, and the first guide blocks are configured to move up and down only along the first groove; and the second vertical movement driving device comprises:

the second vertical rod, wherein the second vertical rod is of a hollow structure, the second vertical rod is provided with a second open end, and two side surfaces of the second vertical rod are each provided with a second groove;

a third synchronous pulley and a fourth synchronous pulley, wherein the third synchronous pulley and the fourth synchronous pulley are rotatably fixed to two ends inside the second vertical rod, respectively;

a second synchronous belt, wherein the second synchronous belt is wound outside the third synchronous pulley and the fourth synchronous pulley;

a second vertical movement driving electric motor, wherein a housing of the second vertical movement driving electric motor is fixed to the second vertical rod, a rotating shaft of the second vertical movement driving electric motor is fixed to a central shaft of the third synchronous pulley or the fourth synchronous pulley, and the second vertical movement driving electric motor is electrically connected to the controller; and the second vertical sliding block, wherein the second vertical sliding block is provided with a second bump and two second guide blocks, the second bump is configured to be embedded into a second open end of the second vertical rod and be fixed to the second synchronous belt, and the second guide blocks are configured to move up and down only along the second groove.

20. The goods loading and unloading apparatus according to claim 1, wherein cross sections of the upper guide rail and the lower guide rail are in an inverted U shape, the first upper roller and the second upper roller are configured to roll on a top surface of the upper guide rail, the first lower roller and the second lower roller are configured to roll on a top surface of the lower guide rail, and the goods loading and unloading apparatus further comprises:

a first upper guiding wheel, wherein a shaft core of the first upper guiding wheel is fixed to the first upper driving bracket via a first upper guiding bracket;

a second upper guiding wheel, wherein a shaft core of the second upper guiding wheel is fixed to the second upper driving bracket via a second upper guiding bracket, wherein the first upper guiding wheel and the second upper guiding wheel are inserted into the upper guide rail, and are configured to roll to touch either of two side walls of the guide rail;

a first lower guiding wheel, wherein a shaft core of the first lower guiding wheel is fixed to the first lower driving bracket via a first lower guiding bracket; and a second lower guiding wheel, wherein a shaft core of the second lower guiding wheel is fixed to the second lower driving bracket via a second lower guiding bracket, wherein the first lower guiding wheel and the second lower guiding wheel are inserted into the lower guide rail, and are configured to roll to touch either of the two side walls of the lower guide rail.

* * * * *